United States Patent Office 3,478,927
Patented Nov. 18, 1969

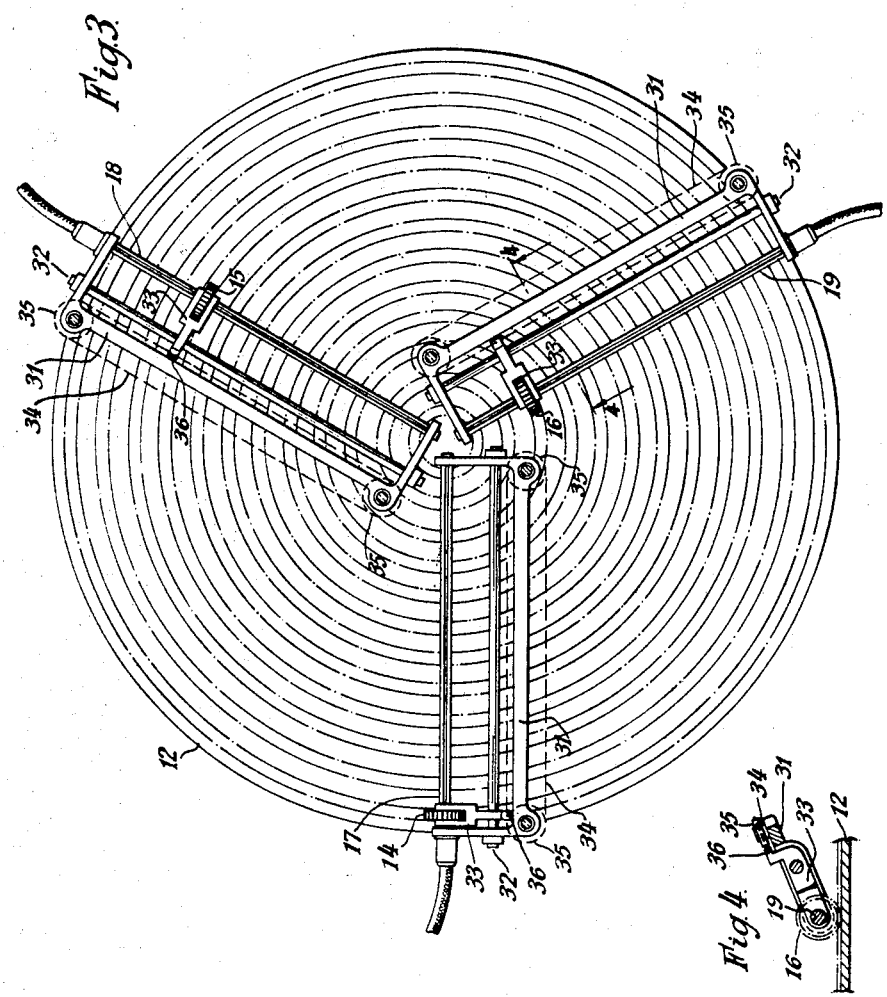

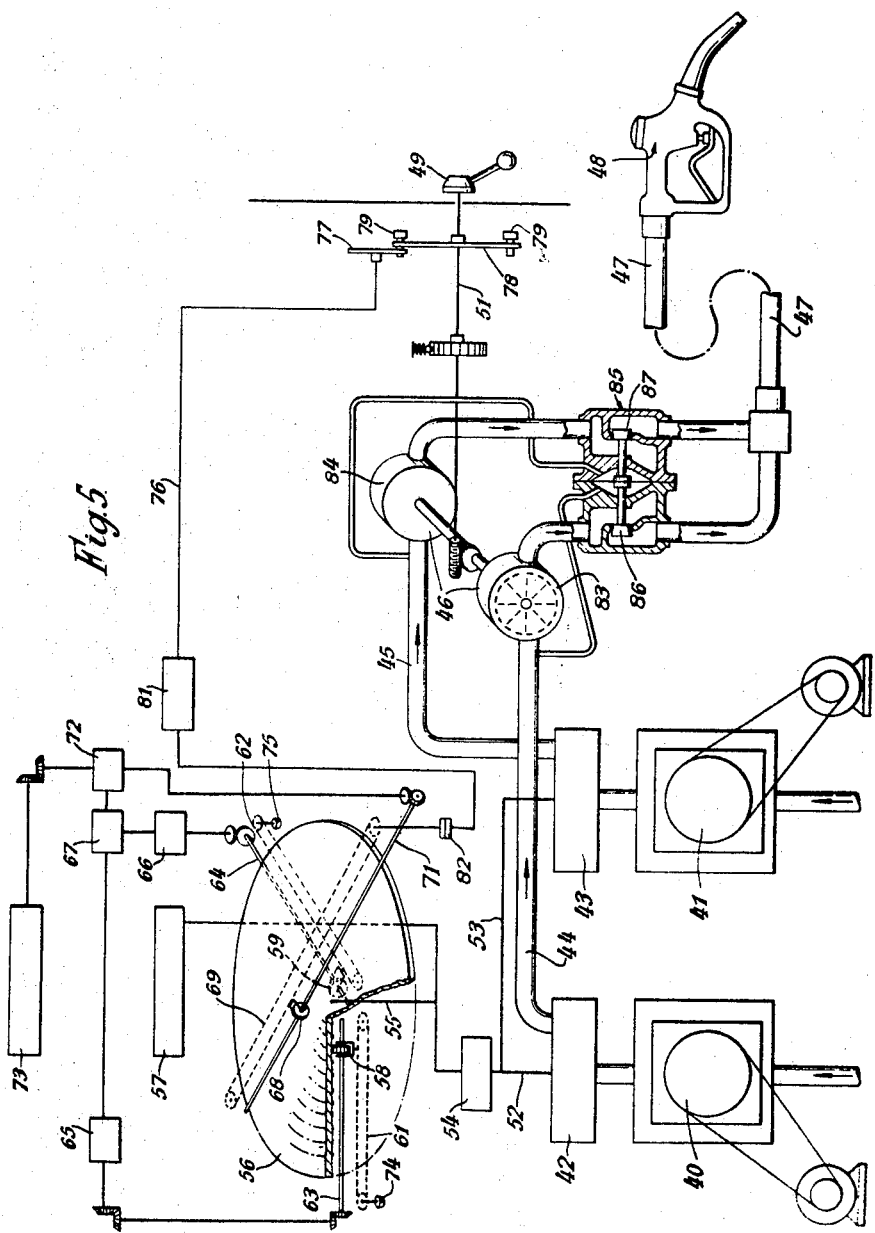

3,478,927
PRICE COMPUTING DEVICES FOR LIQUID DISPENSING APPARATUS
Eric W. Absolon, Chessington, and George H. Bowman, London, England, assignors to Avery-Hardoll Limited and Beck & Company (Meters) Limited, London, England
Filed Nov. 28, 1967, Ser. No. 686,182
Int. Cl. B67d 5/22; F16h 37/06
U.S. Cl. 222—31                         9 Claims

ABSTRACT OF THE DISCLOSURE

A price computing device for liquid dispensing apparatus comprises a disc driven by a liquid meter or meters and wheels rotatable about axes radial to the disc to which rotation is transmitted by rotation of the disc, the distances of the respective wheels from the centre of the disc being separately adjustable so that the rotation of each of them for a given angle of rotation of the disc can be adjusted, the rotations of the said wheels being added together and applied to driving means for a price indicating mechanism.

---

This invention relates to price computing devices for liquid dispensing apparatus such as is used for dispensing motor fuels and has for its object to provide a computing device which can be readily set to compute the price of a total volume of liquid dispensed at any given price per unit volume.

The computing device according to the invention is particularly convenient for use with dispensing apparatus which delivers blends of two liquids in different preselected proportions and in which, instead of the price per unit volume for each blend corresponding to the sum of the prices of the respective quantities of the two liquids in the blend, a different arbitrary price is determined for each of a number of blends containing different proportions of the two liquids, but is also useful in apparatus for dispensing only a single liquid.

A price computing device according to the invention comprises disc means adapted to be rotated by a liquid displacement meter or meters so that the rotation of said disc means is a measure of the total volume of liquid passing through the meter or meters, a plurality of driven wheels, rotatable about axes radial to the disc means by engagement with the disc means during its rotation and at least one of which is movable radially across the disc means by setting means so as to be engageable with the disc means at any one of a plurality of positions at different radial distances from the axis of the disc means, shafts driven by the driven wheels and each connected to an input of an integrating mechanism, and a price indicating mechanism driven by the output of said integrating mechanism.

The driven wheels may be positively driven by the disc means, the said disc means being provided, for example, with a plurality of rings of gear teeth each having a different radius, and the driven wheels being gear wheels adapted to mesh each with any one of said rings of gear teeth. Alternatively, the disc means may have a flat surface, the driven wheels having smooth peripheries in frictional contacts with said flat surface.

The invention is hereinafter described with reference to the accompanying drawings, in which:

FIGURE 3 is a plan view showing one way in which the driven wheels may be mounted;

FIGURE 4 is a section on the line 4—4 of FIGURE 3;

FIGURE 5 is a diagram showing the application of a computing device according to the invention to a liquid dispensing device for dispensing a mixture of two liquids in any one of a number of selected proportions.

Figure 1:
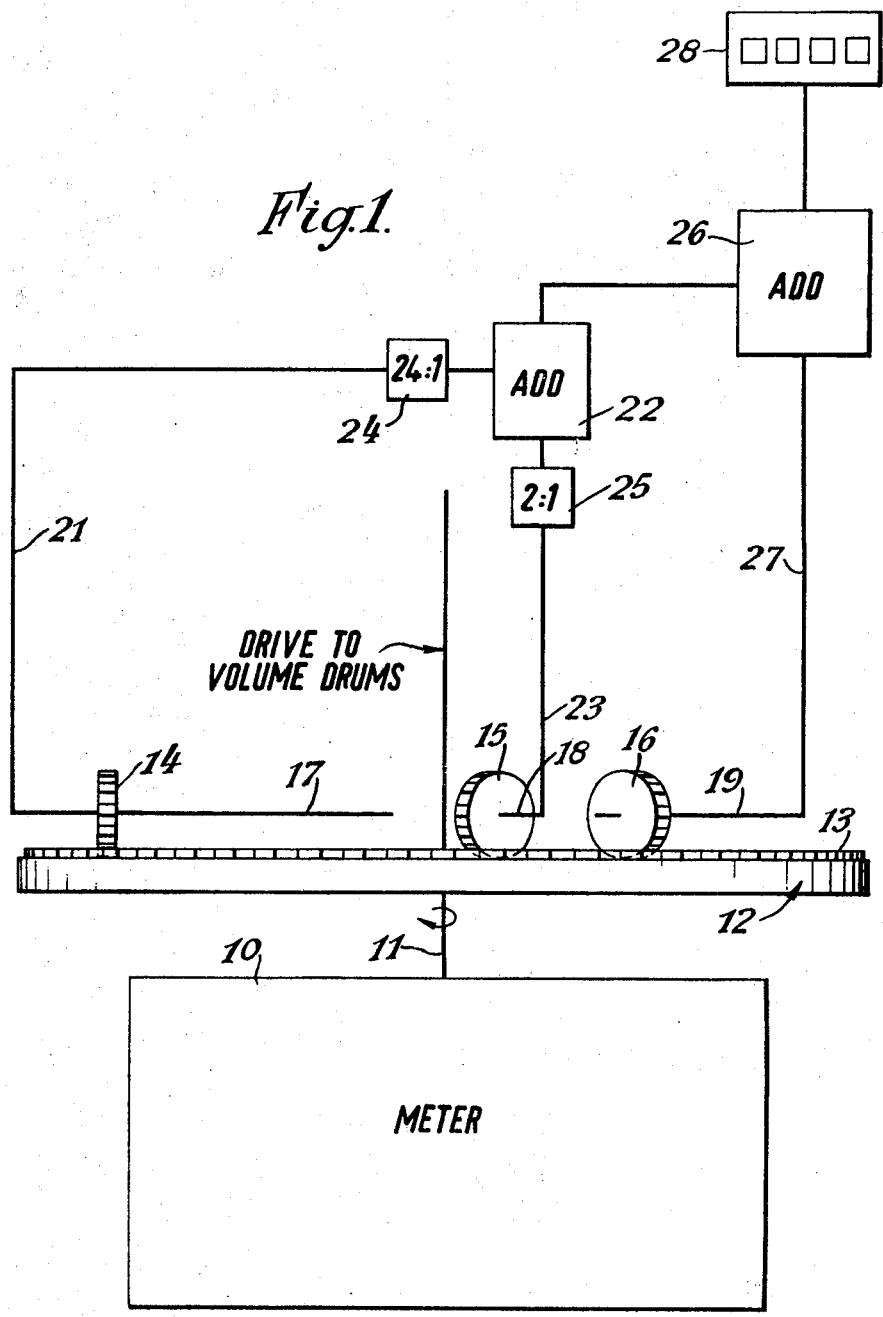
FIGURE 1 is a diagram showing the main components of the computing device.
Figure 2:
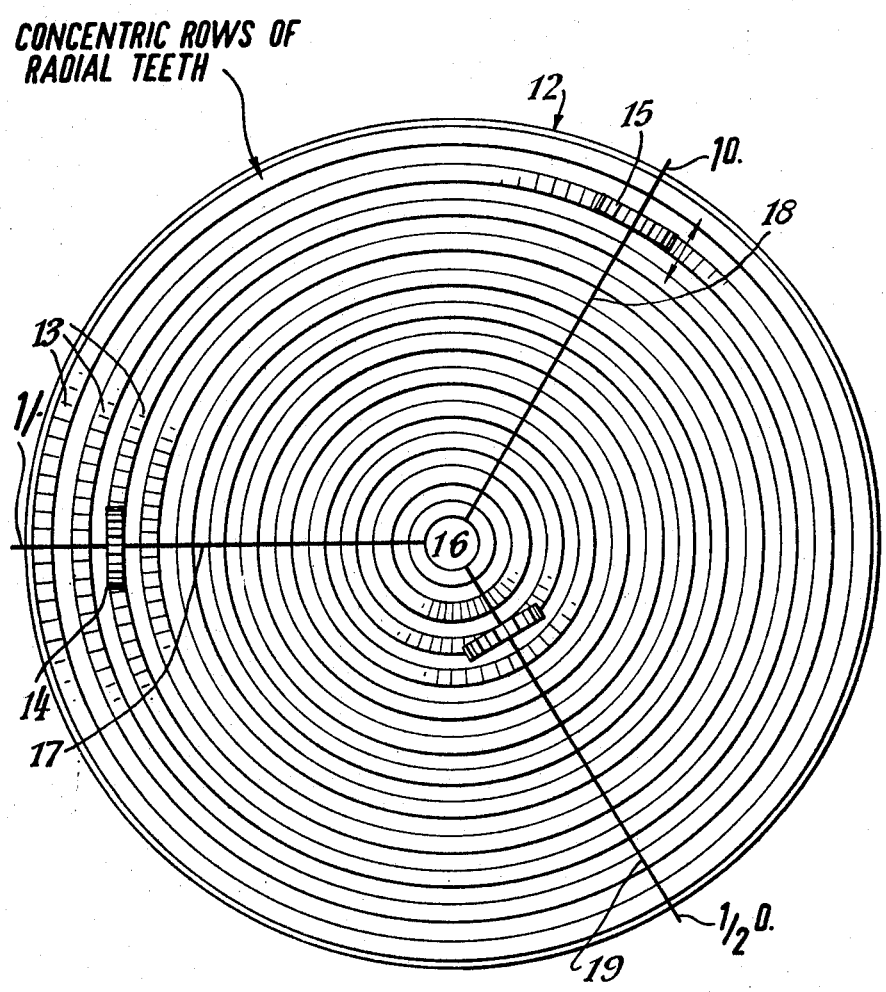
FIGURE 2 is a plan view of the disc of the computing device.

Referring to FIGURE 1 a displacement type liquid meter 10 through which the liquid to be dispensed passes has an output shaft 11 which drives a disc 12 having formed on one face thereof a plurality of concentric rings 13 of gear teeth, for example twelve in number and having numbers of teeth, from the innermost ring outwardly, in the proportions 1:2:3 . . . :12. Three gear wheels 14, 15 and 16, mounted respectively on shafts 17, 18 and 19 extending in different radial directions across the disc 12, are each slidable but not rotatable on the respective shafts, and means are provided for moving each gear wheel along its shaft so that it may be engaged with any one of the rings 13 of gear teeth.

The shafts 17, 18 and 19 carrying the wheels 14, 15 and 16 respectively are as shown in FIGURES 3 and 4, conveniently mounted in frames or carrier means 31 themselves pivoted on fixed supportiing means (not shown) so as to be movable about axes at 32 parallel to the respective shafts to lift the respective gear wheel clear of the disc, each gear wheel being engaged with splines on its shaft so as to rotate the shaft when it is itself rotated, but to be slidable along the shaft. To effect such sliding movement, the gear wheel is engaged by a fork 33 movable along the frame by means such as a belt or sprocket chain 34 running over pulleys or sprocket wheels 35 at the ends of the frame and attached at 36 to the fork.

The gear wheel 14 drives shafting 21 (FIGURE 1) connecting it to one input of an adding differential gear 22, and the gear wheel 15 drives shafting 23 connecting it to the other input of the differential gear 22. As shown in FIGURE 1, the gear wheel 14 drives the first input of the differential gear through gearing 24 having a step-up ratio of 24 so that the rotation of that gear wheel is multiplied by 24, and the gear wheel 15 drives the second input of the differential gear through gearing 25 having a step-up ratio of 2 so that the rotation of that gear wheel is multiplied by 2. The step-up ratios can of course, be embodied in the differential gearing itself.

The output of the differential gear 22 is connected to one input of a second adding differential gear 26, the other input of which is connected by shafting 27 to the gear wheel 16, and the output of the differential gear 26 is applied to a total price indicator 28.

It will be evident that a given angle of rotation of the disc 12, depending on the capacity of the meter 10, will correspond to the passage of a unit quantity of liquid e.g. one gallon, through the meter. If the gear wheels 14, 15 and 16 are of such a size that, when in engagement with the innermost ring of gear teeth 13, they make one revolution when the disc rotates through that angle, the number of revolutions actually made by each of them during the dispensing of a unit quantity of liquid will correspond to the numbers of the rings of gear teeth which they engage if the said rings are numbered 1 to 12 from the centre of the disc outwardly. Thus, if the gear wheel 16, in making one revolution, adds one halfpenny to the total price indication, the gear wheel 15 will add one penny and the gear wheel 14 will add one shilling to the total price indication and, by setting the said gear wheels to engage with appropriate rings of gear teeth corresponding to the numbers of shillings, pence, and halfpence in the unit price of the liquid respectively, a total price equal to the quantity of liquid dispensed multiplied by the unit price will be indicated in the price indicator. If no increment corresponding to that computed by any one of the gear wheels is included in the unit price of the liquid, to be dispensed, that gear wheel may be lifted clear of the disc and held in the lifted position. The gear wheel 16, which computes in increments of one halfpenny, may be movable only between a position in which it engages the innermost ring of gear teeth and a position in which it is out of engagement with any of the said rings. Any gear wheel which is held out of engagement with the disc must be held against rotation to prevent it from being rotated by reaction forces in the differential gears.

A price computing device according to the invention may be used in a liquid dispensing device for dispensing a blend of two liquids, such as motor fuels of different octane ratings or a motor fuel and a lubricating oil, in which the proportions of the two liquids in the mixture can be changed and the unit price used to compute the value of a sale can be varied with the said proportions.

Referring to FIGURE 5, which shows, in diagrammatic form, a liquid dispensing device for dispensing mixtures of two liquids embodying a computing device according to the invention, two pumps 40 and 41 drawing liquid from separate storage tanks deliver the liquids respectively to displacement meters 42 and 43 the liquid from which passes respectively through conduit 44 and 45 to a proportioning device 46 and thence through a coaxial hose assembly 47 to a hosecock 48.

The proportioning device, which will be more fully described hereinafter, is set to determine the proportions of the two liquids in the mixture by rotation of a handle 49 on a shaft 51.

The rotors of the meters 42 and 43 drive shafts 52 and 53 respectively which are connected to the two inputs of a differential gear unit 54 so that the rotation of the output shaft 55 of the differential gear unit is the sum of the rotations of the shafts 52 and 53. A disc 56 corresponding to the disc 12 in FIGURES 1 and 3, is mounted on the output shaft 55. A quantity indicating counter 57 is also driven from the shaft 55.

Two gear wheels 58 and 59, corresponding respectively to the gear wheels 14 and 15 in FIGURE 1, co-operate with rings of gear teeth on one side of the disc 56, being movable across the face of the disc by mechanism 61 and 62 respectively similar to those described with reference to FIGURE 3, the shafts 63 and 64 carrying the said gear wheels 58 and 59 being connected, through gearboxes 65 and 66 respectively to the two inputs of a differential gear unit 67. The gearbox 65 has a fixed step-up ratio of 24, and the gearbox 66 has a fixed step-up ratio of 2 so that the rotations applied to the inputs of the differential gear unit 67 are respectively the rotation of the gear wheel 58 multiplied by 24 and the rotation of the gear wheel 59 multiplied by 2.

A third gear wheel 68, corresponding to the gear wheel 16 in FIGURE 1, co-operates with rings of gear teeth on the other side of the disc 56, and is movable across the face of the disc by another mechanism 69 similar to those described with reference to FIGURE 3, the range of movement of the gear wheel 68 extending on both sides of the centre of the disc 56, whereas the ranges of movement of the gear wheels 58 and 59 each extend only on one side of the said centre. The shaft 71 carrying the gear wheel 68 drives one input of another differential gear unit 72, the other input of which is connected to the output of the differential gear unit 67, the output of the differential gear unit 72 being coupled to a price indicating counter 73.

The positions of the gear wheels 58 and 59 are separately adjustable, for example by means of manual control knobs 74 and 75 which can be arranged in a locked compartment or otherwise protected from unauthorised adjustment.

The position of the gear wheel 68 is controled by the handle 49 which sets the proportioning device, so that the price increment fed to the counting device 73 by rotation of the gear wheel 68 changes with the proportions of the liquids in the mixture dispensed. Shafting 76 coupled to one of the pulleys or sprocket wheels carrying the belt or chain which move the gear wheel 68 across the disc 56, carries a toothed wheel 77 driven by rotation of the handle 49 by a disc 78 mounted on the shaft 51 and formed with a circumferential series of holes in which can be mounted pegs 79 to mesh with the teeth of the wheel 77. Thus, by inserting pegs 79 in the appropriate holes in the disc, the position of the gear wheel 68 corresponding to any position of the handle 49 can be selected. The shafting 76 drives a unit price indicator 81 which shows the unit price of any mixture of liquids selected, and a clutch 82 between the unit price indicator 81 and the shaft 71 enables the unit price indicator 81 to be reset relative to the gear wheel 68.

By manipulation of the knobs 74 and 75 the gear wheels 58 and 59 can be set to fixed positions so as to compute a fixed price component to which is added a variable increment determined by the mixture proportions. The fixed price component may be the minimum price of any liquid to be dispensed (e.g.) the price of the cheaper component of the mixture alone, in which case the increments determined by the mixture proportion setting are all additive, or may be the price of some selected mixture within the total range available, in which case the increments determined by the mixture proportion setting may be additive or subtractive.

The proportioning device 46, as described in our co-pending application No. 49,003/66 comprises two variable capacity liquid meters 83 and 84 having their shafts connected, with means, operated by the shaft 51, for changing the capacities of the meters simultaneously in opposite directions so that as the capacity of one meter is changed from zero to a maximum the capacity of the other meter is changed from a maximum to zero. A pressure regulator device 85, comprising valves 86 and 87 in the conduits 44 and 45 respectively, downstream of the meters 83 and 84 is provided to reduce the pressure difference across either one of the meters when the meter is holding back the flow of liquid and thus reduce the tendency to leakage across that meter, each valve 86 or 87 being subjected to a force tending to close it when the pressure upstream of the meter in the conduit in which that valve is mounted is greater than the pressure of the corresponding point in the other conduit.

Whilst it is preferred to provide a positive drive to the driven wheels using toothed driven wheels engaging rings of gear teeth as described above, the driven wheels may be friction wheels engaging with a friction surface or surfaces on the disc.

Instead of providing gearing between one or more of the driven wheels and the integrating mechanism, the driven wheels may be of different diameters.

When the price computing device according to the invention is driven by a single meter, one of the driven wheels may be mounted so as to be movable across the centre of the disc, as described with reference to FIGURE 5, so that provision is available for negative price increments.

The invention has been described in connection with a device for computing prices in sterling, but, by modification of the ratios of the gear units 24 and 25 in FIGURE 1 or the corresponding gear units 65 and 66 in FIGURE 5, the computations may be made in a decimal currency.

We claim:
1. A price computing device for liquid dispensing apparatus comprising disc means adapted to be rotated by a liquid displacement meter so that the rotation of said disc means is a measure of the total volume of liquid passing through the meter, comprising, a plurality of pivotally mounted carrier means arranged radially of and in spaced relation to said disc means, endlessly driven settable setting means on said pivotal carrier, driven wheels supported on said pivotal carrier and driven by said endlessly driven setting means, said driven wheels being rotatable about axes extending radially of the disc means by engagement therewith during its rotation, shaft means arranged to be driven by each of the driven wheels and each connected to an input of integrating mechanism, the output of which is adapted to drive a price indicating mechanism, whereby the pivotally mounted carrier means may be tilted about its radially extending axis to permit setting of the driven wheels into engagement with the disc means at any one of a plurality of positions at different radial distances from the axis of the disc means.

2. A price computing device according to claim 1, wherein the driven wheels are positively driven by the disc means.

3. A price computing device according to claim 2, wherein the disc means is provided with a plurality of rings of gear teeth each having a different radius, and the driven wheels are gear wheels adapted to mesh each with any one of said rings of gear teeth.

4. A price computing device according to claim 1, wherein the disc means has a flat surface and the driven wheels have smooth peripheries in frictional contact with said flat surface.

5. A price computing device according to claim 1, wherein the driven wheels are of different radii one from another.

6. A price computing device according to claim 1, wherein gearing is provided between at least one of the driven wheels and the integrating mechanism to drive the input of the said integrating mechanism to which that driven wheel is connected at a speed different from that of the said driven wheel.

7. A price computing device for liquid dispensing apparatus comprising liquid displacement meter means through which liquid to be dispensed is passed, shaft means mounted for rotation, disc means having a generally planar surface to which one end of said shaft means is secured coaxially, drive means associated with said liquid displacement meter means and coupled to said disc means to rotate said disc means through an angle of rotation which is a measure of the total volume of liquid passing through said liquid displacement meter means, a pair of driven wheels mounted for rotation about axes radial to said disc means, setting means adapted to move each said driven wheel radially across said disc means so that each said driven wheel is engageable with a portion of said planar surface at any selected one of a plurality of positions at different radial distances from the axis of said disc means, an integrating mechanism having two inputs and an output, a price indicating mechanism to which said output is drivingly connected, and a pair of shaft each driven by a corresponding one of said pair of driven wheels and connected to a corresponding input of said integrating mechanism, wherein the improvement comprises:

(a) said disc means having two generally planar surfaces which are parallel to each other, and (b) said setting means being adapted to move one of said driven wheels radially across the generally planar surface to which said shaft means is secured and being adapted to move the other of said driven wheels radially across the other generally planar surface so that said other driven wheel is movable to positions on both sides of the axis of said disc means and is thus capable of being rotated in opposite directions by rotation of said disc means in the same direction.

8. A price computing device according to claim 7, wherein the improvement further comprises:

(a) a third driven wheel mounted for rotation about an axis radial to said disc means and adapted to be moved by said setting means radially across the generally planar surface to which said shaft means is secured, (b) a third shaft driven by said third driven wheel, and (c) a further integrating mechanism having two inputs and an output, the two shafts driven by the two wheels which are engageable with the generally planar surface to which said shaft means is secured being connected to corresponding inputs of said further integrating mechanism and the output of said further integrating mechanism being connected to an input of the first mentioned integrating mechanism.

9. A price computing device according to claim 7 wherein the disc is driven by the liquid displacement meter through an adding differential gear and at least one of the driven wheels is movable across the disc by said setting means which also set a proportioning device to determine the ratio between the volumes of liquid delivered by the said displacement meter.

References Cited

UNITED STATES PATENTS

| | | | |
|---|---|---|---|
| 2,128,413 | 8/1938 | Hejduk et al. | 74—681 X |
| 2,145,843 | 1/1939 | Maxson | 74—681 |
| 2,498,821 | 2/1950 | Olsson | 74—681 |
| 2,619,849 | 12/1952 | Trexler | 74—681 |
| 2,886,211 | 5/1959 | McGaughey et al. | 222—26 |
| 2,898,002 | 8/1959 | Blanchet et al. | 222—26 |

SAMUEL F. COLEMAN, Primary Examiner

U.S. Cl. X.R.

74—681